United States Patent
Kim et al.

(10) Patent No.: US 12,537,186 B2
(45) Date of Patent: Jan. 27, 2026

(54) ANODE ACTIVE MATERIAL COMPRISING GRAPHENE-SILICON COMPOSITE, MANUFACTURING METHOD THEREFOR, AND LITHIUM SECONDARY BATTERY COMPRISING SAME

(71) Applicant: GRAPSIL CO., LTD., Chungcheongnam-do (KR)

(72) Inventors: Huijin Kim, Chungcheongnam-do (KR); Hyunki Park, Seoul (KR); Yohan Hong, Jeollabuk-do (KR); Jungsu Park, Jeollanam-do (KR); Jonggeun Lee, Jeollabuk-do (KR)

(73) Assignee: GRAPSIL CO., LTD., Chungcheongnam-do (KR)

( * ) Notice: Subject to any disclaimer, the term of this patent is extended or adjusted under 35 U.S.C. 154(b) by 638 days.

(21) Appl. No.: 17/907,016

(22) PCT Filed: Oct. 18, 2021

(86) PCT No.: PCT/KR2021/014518
§ 371 (c)(1),
(2) Date: Sep. 22, 2022

(87) PCT Pub. No.: WO2022/086098
PCT Pub. Date: Apr. 28, 2022

(65) Prior Publication Data
US 2023/0104118 A1     Apr. 6, 2023

(30) Foreign Application Priority Data
Oct. 23, 2020     (KR) ........................ 10-2020-0138027

(51) Int. Cl.
*H01M 4/36*     (2006.01)
*H01M 4/02*     (2006.01)
(Continued)

(52) U.S. Cl.
CPC ......... *H01M 4/364* (2013.01); *H01M 4/0404* (2013.01); *H01M 4/386* (2013.01);
(Continued)

(58) Field of Classification Search
None
See application file for complete search history.

(56) References Cited

U.S. PATENT DOCUMENTS

2014/0255785 A1* 9/2014 Do ........................... C09D 7/61
429/232
2019/0386314 A1* 12/2019 Lanning .............. H01M 10/052
(Continued)

FOREIGN PATENT DOCUMENTS

| KR | 10-2013-0016727 A | 2/2013 |
| KR | 10-2019-0027883 A | 3/2019 |
| KR | 10-2166645 B1 | 10/2020 |

OTHER PUBLICATIONS

He et al., A novel bath lily-like graphene sheet-wrapped nano—Si composite as a high performance anode material for Li—ion batteries, RSC Adv., 2011,1, 958-960, available at https://pubs.rsc.org/en/content/articlelanding/2011/ra/c1ra00429h (Year: 2011).*
He, Yu-Shi, et al. "A novel bath lily-like graphene sheet-wrapped nano—Si composite as a high performance anode material for Li—ion batteries." RSC Advances 1, (2011): 958-960.

*Primary Examiner* — Scott J. Chmielecki
(74) *Attorney, Agent, or Firm* — Mendelsohn Dunleavy, P.C.

(57) ABSTRACT

The present disclosure provides an anode active material comprising a graphene-silicon composite, a manufacturing method therefor, and a lithium secondary battery comprising same, wherein the graphene-silicon composite is a secondary graphene-silicon composite formed by gathering primary graphene-silicon composites on a conductive carbon matrix, and the primary graphene-silicon composites are (Continued)

formed of silicon-containing particles laminated (layered) on a reduced graphene oxide sheet.

10 Claims, 9 Drawing Sheets

(51) Int. Cl.
    *H01M 4/04*          (2006.01)
    *H01M 4/38*          (2006.01)
    *H01M 4/583*        (2010.01)
    *H01M 4/66*          (2006.01)

(52) U.S. Cl.
    CPC ........... *H01M 4/583* (2013.01); *H01M 4/663* (2013.01); *H01M 2004/021* (2013.01); *H01M 2004/027* (2013.01)

(56) References Cited

U.S. PATENT DOCUMENTS

| | | | |
|---|---|---|---|
| 2020/0227730 A1* | 7/2020 | Zhamu | H01M 10/0525 |
| 2020/0295344 A1* | 9/2020 | Jeong | H01M 4/366 |
| 2021/0122930 A1* | 4/2021 | Burshtain | C09D 7/61 |
| 2021/0242450 A1* | 8/2021 | Jang | H01M 4/386 |
| 2021/0399288 A1* | 12/2021 | Zhang | H01M 10/0525 |
| 2022/0115646 A1* | 4/2022 | Colwell | H01M 4/366 |
| 2022/0263084 A1* | 8/2022 | Paik | H01M 4/583 |
| 2023/0238514 A1* | 7/2023 | Lee | C04B 35/62839 |
| | | | 429/231.4 |
| 2025/0118802 A1* | 4/2025 | Yoneda | H01M 4/13 |

* cited by examiner

ANODE ACTIVE MATERIAL COMPRISING GRAPHENE-SILICON COMPOSITE, MANUFACTURING METHOD THEREFOR, AND LITHIUM SECONDARY BATTERY COMPRISING SAME

TECHNICAL FIELD

The present disclosure relates to a high-capacity anode active material having excellent conductivity, a manufacturing method thereof, and a lithium secondary battery including the same and thus having excellent lifespan, output, and safety characteristics.

The national research and development projects that supported the present disclosure are described below.
Project Number 1425136568
Project Serial Number S2832482
Government Department Ministry of SMEs and Startups, Republic of Korea
Specialized Institution for Project Management Korea Technology and Information Promotion Agency for SMEs
Title of Work 2019 Tech Incubator Program for Startup (TIPS), Startup Team Support Project
Title of Project Development of carbon/Si nanocomposite and high-capacity (>1300 mAh/g) anode material for secondary battery
Executing Organization Grapsil Co., Ltd.
Period 2019 Dec. 1~2021 Nov. 30

BACKGROUND ART

Lithium secondary batteries are widely used as power sources for mobile electronic devices, including mobile phones, and are finding more applications because large devices such as electric vehicles increasingly use the lithium secondary batteries.

Meanwhile, most of the currently commercially available lithium secondary batteries use a carbon-based material as an anode active material. In particular, graphite exhibits highly reversible charge/discharge behaviors due to the uniaxial orientation of a graphite layer, thereby having good lifespan characteristics. In addition, since graphite exhibits a very similar potential to lithium metal, it is possible to obtain high-energy batteries when graphite is used in combination with a lithium metal cathode in a battery. However, despite these advantages, the low theoretical capacity (372 mAh/g) of graphite is an obstacle in increasing applications even at the present time at which high-capacity batteries are required.

Accordingly, there is an attempt to use a metal such as Si, Sn, and Al which exhibit a relatively high capacity as a material to replace the existing carbon-based anode active material. However, these metals exhibit repeated large volume changes during the intercalation and deintercalation of lithium, resulting in pulverization thereof and the loss of electrical conduction paths, thereby leading to a short cycle life and overall cell performance deterioration.

To solve this problem, many efforts have been made. For example, various carbon materials are simply mixed with silicon (Si), fine powdery silicon is chemically fixed on the carbon surface by a silane coupling agent, or amorphous carbon is deposited on the silicon surface through chemical vapor deposition (CVD) or the like.

However, in the case where a carbon material is simply mixed with silicon, carbon is liberated from silicon while Si undergoes large volume expansion and contraction during charging and discharging, which leads to reduction in electrical conductivity, resulting in a significant decrease in lifespan.

On the other hand, in the case where fine powdery silicon is chemically fixed on the carbon surface through CVD or using a coupling agent such as silane, the duration of bonding provided by the silane coupling agent or CVD is not so long, and the cycle life decreases with increase in the number of charging and discharging cycles. Moreover, there is a problem in that it is difficult to obtain a reliable anode material due to difficulty in attaining uniform physical and chemical bonding.

Despite these various attempts, there still remains the problem that electrodes are damaged due to the expansion of silicon during discharging.

Therefore, there is an increasing need for a high-capacity anode active material having excellent electrical conductivity and a lithium secondary battery having a long cycle life and good output characteristics and being highly safe by employing such an anode active material.

DISCLOSURE

Technical Problem

The present disclosure is intended to disclose means for solving the problems of the existing technology described above and the technical problems that have not yet been solved.

Specifically, it is an objective of the present disclosure to provide a highly conductive high-capacity anode active material.

Another objective of the present disclosure is to provide a method of manufacturing a highly conductive high-capacity anode active material.

A further objective of the present disclosure is to provide a lithium secondary battery employing the anode active material, thereby having a long cycle life and good output characteristics and being highly safe.

Technical Solution

The present disclosure provides an anode active material including a secondary graphene-silicon composite in which a primary graphene-silicon composite is formed on a conductive carbon matrix, the primary graphene-silicon composite including a graphene-silicon composite formed of silicon-containing particles laminated on a reduced graphene oxide sheet.

The primary graphene-silicon composite may be in a form in which one or more silicon-containing particles and one or more reduced graphene oxide sheets are alternately laminated by electrostatic attraction.

The average particle size $D_{50}$ of the secondary graphene-silicon composite may be in the range of from 5 to 20 μm.

In the secondary graphene-silicon composite, the weight ratio of silicon to reduced graphene oxide sheet and conductive carbon may be in the range of from 30:70 to 55:45.

The present disclosure also provides
a method of preparing an anode active material including a graphene-silicon composite which is a secondary graphene-silicon composite in which a primary graphene-silicon composite is formed on a conductive carbon matrix, the method comprising:
(a) wet-mixing a graphene oxide sheet and a silicon precursor and drying the mixture;

(b) preparing the primary graphene-silicon composite made from silicon-containing particles laminated on the graphene oxide sheet that is reduced through heat treatment after the drying; and (c) adding a conductive carbon precursor to the primary graphene-silicon composite and firing the mixture of the conductive carbon precursor and the primary graphene-silicon composite in an inert atmosphere to prepare the secondary graphene-silicon composite.

The primary graphene-silicon composite may be in a form in which one or more silicon-containing particles and one or more reduced graphene oxide sheets are alternately laminated by electrostatic attraction.

In step (a), the wet-mixing may be performed in an organic solvent.

In step (a), the content of the graphene oxide sheet may be in the range of from 5% to 50% by weight relative to the total weight of the primary graphene-silicon composite.

In step (b), the heat treatment may be performed for 10 to 60 minutes at a temperature in the range of from 200° C. to 400° C. in an $Ar/H_2$ 3-10% atmosphere.

In step (c), the conductive carbon precursor may include 0.5% to 20% by weight of an amorphous carbon precursor relative to the total weight of the secondary graphene-silicon composite.

In step (c), the firing may be performed at a temperature in the range of from 500° C. to 1200° C. for 0.5 to 5 hours.

In the secondary graphene-silicon composite, the weight ratio of silicon to reduced graphene oxide sheet and conductive carbon may be in the range of from 30:70 to 55:45.

The average particle size $D_{50}$ of the secondary graphene-silicon composite may be in the range of from 5 to 20 μm.

The present disclosure also provides a lithium secondary battery including the anode active material.

Advantageous Effects

Since the anode active material prepared according to the present disclosure includes a secondary silicon composite in which a primary graphene-silicon composite is formed on a conductive carbon matrix, particle morphology collapse may be minimized during repeated charging and discharging cycles. In addition, the contact between the silicon particles and the electrolyte may be suppressed. Therefore, the safety of a lithium secondary battery can be ensured.

In the present disclosure, since the primary graphene-silicon composite is formed by laminating silicon-containing particles on a reduced graphene oxide sheet, the capacity per unit volume is maximized and the electrical conductivity is improved. Therefore, the lifespan characteristics and the output characteristics of the lithium secondary battery can be improved.

In addition, since the reduced graphene oxide sheet and the silicon-containing particles are coupled by electrostatic attraction, even though the contraction and expansion of the silicon-containing particles repeatedly occur due to the intercalation and deintercalation of lithium ions during the charging and discharging of the cell, the volume expansion and damage can be suppressed. Therefore, electrode damage can be minimized.

DESCRIPTION OF DRAWINGS

FIGS. 6A and 6B show results of electrical conductivity and capacity measurement according to Experimental Example 4.

BEST MODE

Anode Active Material Including Graphene-Silicon Composite

Figure 1:
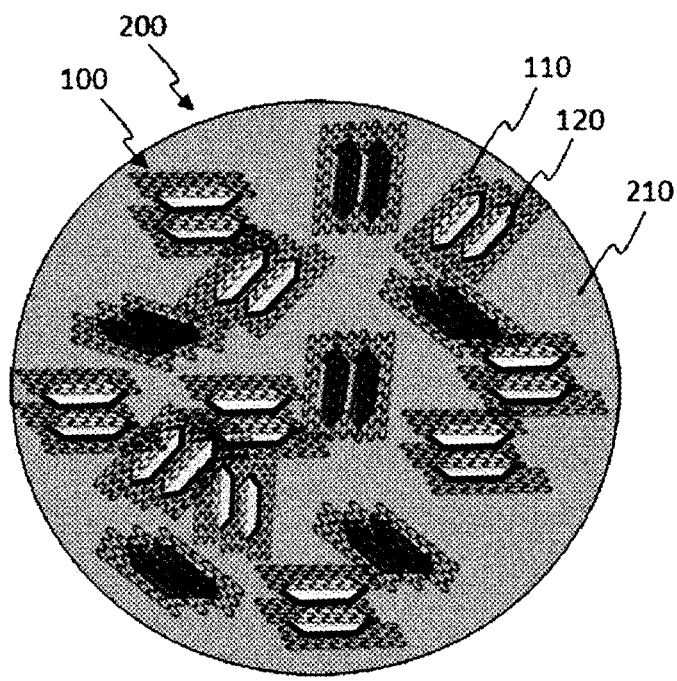
FIG. 1 is a schematic diagram schematically illustrating a cross-section of an anode active material including a graphene-silicon composite according to one embodiment of the present disclosure.

FIG. 1 is a schematic diagram schematically illustrating a cross-section of an anode active material including a graphene-silicon composite according to an embodiment of the present disclosure, but embodiments of the present disclosure are not limited thereto.

Referring to FIG. 1, the present disclosure provides
an anode active material including a graphene-silicon composite which is a secondary graphene-silicon composite 200 prepared from a process in which a primary graphene-silicon composite 100 is formed on a conductive carbon matrix 210, in which
the primary graphene-silicon composite 100 is formed from silicon-containing particles 120 laminated on a reduced graphene oxide sheet 110.

In the present disclosure, the term "conductive carbon matrix 210" means that conductive carbon materials are positioned in a continuous phase. These conductive carbon materials may be formed from a mixture of different carbon types each with a different crystallinity.

In the present disclosure, the term "secondary graphene-silicon composite 200" is a particle in which one or more primary graphene-silicon composites 100 are distributed continuously or noncontinuously on the conductive carbon matrix 210 so as to look like a single particle, and the secondary graphene-silicon composite 200 has a structure in which amorphous carbon surrounds the surface of the primary graphene-silicon composite 100.

Silicon exhibits a theoretical capacity of about 3,600 mA/g which is higher than those of conventional carbon-based anode materials but has a problem in that it exhibits a large volume change during intercalation and deintercalation of lithium ions, resulting in pulverization of silicon and loss of an electrical conduction path which leads to deterioration in the lifespan characteristics.

Since the anode active material prepared according to the present disclosure includes a secondary silicon composite in which a primary graphene-silicon composite is formed on a conductive carbon matrix, particle morphology collapse may be minimized during repeated charging and discharging cycles. In addition, the contact between the silicon particles and the electrolyte may be suppressed. Therefore, the safety of a lithium secondary battery can be ensured. In addition, since the capacity per unit volume is maximized and the electrical conductivity is improved due to the structural characteristics of the lithium secondary battery, the lifespan characteristics and the output characteristics of the lithium secondary battery can be improved.

Specifically, in the primary graphene-silicon composite 100, one or more silicon-containing particles 120 and one or more reduced graphene oxide sheets 110 are alternately laminated and coupled by electrostatic attraction. That is, due to the electrostatic attractive coupling of the graphene oxide sheets and the silicon-containing particles, the volume expansion and damage can be inhibited even though the silicon-containing particles experience repeated contraction and expansion due to intercalation and deintercalation of lithium ions during charging and discharging of the battery. Therefore, electrode damage can be minimized.

Here, as can be seen from FIG. 1, the term "alternatively laminated" means that the reduced graphene oxide sheets 110 and the silicon-containing particles 120 are repeatedly laminated on each other by electrostatic attraction, in which the number of layers of the reduced graphene oxide sheets and the number of layers of the silicon-containing particles in the laminate are not limited.

The silicon-containing particles may be particles of one or more materials selected from the group consisting of Si, SiO, $SiO_2$, and SiC, but are not limited thereto. Specifically, the silicon-containing particles may be Si particles.

The average particle size $D_{50}$ of the secondary graphene-silicon composite may be in the range of from 5 to 20 μm. When the average particle size $D_{50}$ is smaller than the lower limit of the above range, the process efficiency decreases. Conversely, when the average particle size $D_{50}$ is excessively large and exceeds the upper limit of the above range, it is undesirable because pulverization (fine-graining) and contact with the electrolyte may occur during charging and discharging.

In the secondary graphene-silicon composite, the weight ratio of silicon to reduced graphene oxide sheet and conductive carbon may be in the range of from 30:70 to 55:45. When the silicon content is lower than the lower limit of the above range, the capacity per unit volume is reduced. When the silicon content is higher than the upper limit of the above range, the buffering effect obtained due to the reduced graphene oxide sheet and the conductive carbon may not be sufficient, and the mechanical strength is reduced. Therefore, there is a risk of durability deterioration. Specifically, the weight ratio may range from 35:65 to 45:55.

Method of Preparing Anode Active Material Including Graphene-silicon Composite

Figure 2:
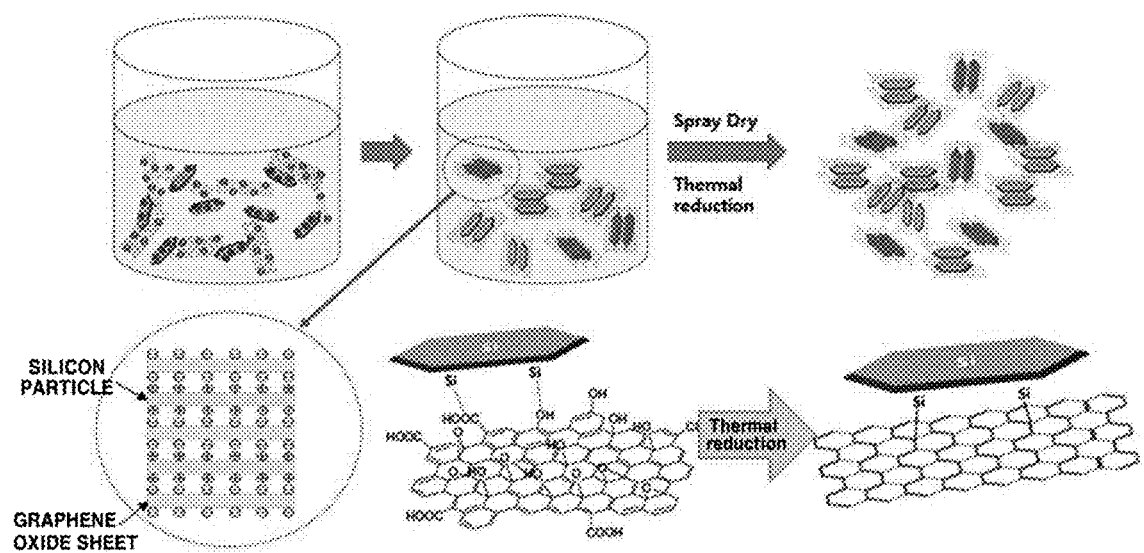
FIG. 2 is a schematic diagram schematically illustrating a process of manufacturing an anode active material including a graphene-silicon composite according to one embodiment of the present disclosure.

FIG. 2 is a schematic diagram schematically illustrating a process of preparing an anode active material including a graphene-silicon composite according to one embodiment of the present disclosure, but the preparation method is not limited thereto.

Referring to FIG. 2, a method of preparing a secondary graphene-silicon composite in which a primary graphene-silicon composite is formed on a conductive carbon matrix includes:
(a) wet-mixing a graphene oxide sheet and a silicon precursor and drying the mixture;
(b) preparing a primary graphene-silicon composite made from silicon-containing particles laminated on the graphene oxide sheet reduced through heat treatment after the drying; and
(c) adding a precursor of amorphous carbon to the primary graphene-silicon composite and then firing the resulting mixture in an inert atmosphere to produce a secondary graphene-silicon composite.

In step (a), the graphene oxide sheet and the silicon precursor may be mixed in an organic solvent to produce the mixture.

Regarding the production of the graphene oxide sheet, for example, a carboxyl group (COOH) or a hydroxy group (OH) group may be introduced into a graphite using known methods to produce a graphene oxide sheet having a negative surface potential. The number of layers of the graphene oxide sheet is not particularly limited but may be within the range of 1 to 10.

The silicon precursor may be one or more materials selected from among tetraethyl orthosilicate, triethoxymethyl silicate, diethoxydimethylsilane, ethoxymethylsilane, 3-amino-propyltriethoxysilane, and 3-amino-propyltrimethoxysilane. Alternatively, the silicon precursor may be a conventional silicon particle or a silicon nanoparticle. In some cases, amino groups ($NH_2$) may be introduced into the silicon particles to enhance the positive surface potential.

In the present disclosure, the silicon particles and the graphene oxide sheets may structurally stably and uniformly coupled through wet mixing. Specifically, the organic solvent may be an alcohol-based solvent such as ethanol, propanol, or isopropanol, except for distilled water that may cause a side reaction due to its polarity.

When the silicon precursor is added to the organic solvent in which the graphene oxide sheets having a negative surface potential are dispersed, the silicon particles having a positive surface potential are bonded to the graphene oxide sheets having a negative surface potential due to the electrostatic attraction. This produces a laminate of the silicon particles and the graphene oxide sheets. That is, one or more silicon-containing particles and one or more graphene oxide sheets are alternately laminated by electrostatic attraction. For example, there may be a form in which a silicon-containing particle is laminated on a graphene oxide sheet and a form in which a silicon-containing particle is laminated on a graphene oxide sheet and another graphene oxide sheet is laminated on the silicon-containing particle.

In any case, the content of the graphene oxide sheet may be in the range of from 5% to 50% by weight relative to the total weight of the primary graphene-silicon composite. When the content of the graphene oxide sheet is lower than 5% by weight, it is difficult to solve the problem caused due to the volume expansion and contraction of the silicon particles during the charging and discharging of the cell. When the content of the graphene oxide sheet exceeds 50% by weight, the content of the silicon particles may be reduced, resulting in reduction in the capacity per unit volume.

In some cases, agitation may be performed to not inhibit the coupling of the graphene oxide sheets with the silicon particles and to shorten the time required for the electrostatic attractive coupling.

After the wet mixing, drying may be performed. Any drying method, for example, spray drying, may be used, but the drying method is not limited thereto.

In step (b), the primary graphene-silicon composite in which the silicon-containing particles are laminated on the graphene oxide sheets that are reduced through heat treatment after the drying may be produced.

The heat treatment may be performed for 10 to 60 minutes under conditions of a temperature in the range of from 200° C. to 400° C. and an inert atmosphere. For the inert atmosphere, a gas of an inert element selected from argon, nitrogen, and helium, may be used. More particularly, the inert atmosphere may be an $Ar/H_2$ 3-10% atmosphere. When the heat treatment is performed at a temperature lower than 200° C. or is performed for a duration shorter than 10 minutes, it is difficult for the graphene oxide to be sufficiently reduced. When the heat treatment is performed at a temperature higher than 400° C. for a duration longer than 60 minutes, there is a risk of damage to the particles of the composite. Specifically, the heat treatment may be carried out at a temperature in the range of from 250° C. to 350° C. for a duration in the range of 10 to 60 minutes.

With this heat treatment, the reduction of the graphene oxide sheet can be achieved. The coupling of the reduced graphene oxide sheet and the silicon-containing particle can be maintained even after the heat treatment, resulting in the structural stability being ensured.

In step (c), the secondary graphene-silicon composite may be produced by adding a conductive carbon precursor to the primary graphene-silicon composite and firing the resulting mixture in an inert atmosphere.

The conductive carbon precursor may be a mixture of carbon materials being differ in crystallinity. For example, the precursor of the amorphous carbon and the precursor of the crystalline carbon may be mixed.

One or more precursors selected from the group consisting of coal-based pitch, mesophase pitch, petroleum-based pitch, coal-based oil, petroleum-based heavy oil, organic synthetic pitch, phenolic resin, furan resin, and polyimide resin may be used as the precursor of the amorphous carbon to produce the secondary graphene-silicon composite, and the strength of the secondary graphene-silicon composite prepared can be appropriately adjusted to maintain the shape of the core-shell so that the expansion of the core can be suppressed.

The content of the precursor of the amorphous carbon may be in the range of from 0.5% to 20% by weight relative to the total weight of the secondary graphene-silicon composite. When the content of the precursor of the amorphous carbon is lower than 0.5% by weight, it is difficult to impart sufficient strength to the prepared secondary graphene-silicon composite. In this case, it is difficult to inhibit the expansion of the core. The content exceeding 20% by weight is undesirable because dispersion stability is impaired when preparing an anode preparation mixture.

The crystalline carbon may be any one or a combination of two or more selected from the group consisting of natural graphite, synthetic graphite, expanded graphite, graphene, carbon black, and fullerene soot to improve the electrical conductivity.

The firing may be performed at a temperature in the range of from 500° C. to 1200° C. for 0.5 to 5 hours and more particularly in the range of from 950° C. to 1000° C. for 1 to 4 hours.

Through the firing, impurities such as relatively low-boiling point hydrocarbons and sulfur can be removed not to be included in the secondary graphene-silicon composite. For example, when a petroleum-based pitch is used as the amorphous carbon precursor, the carbide of the pitch may be formed as the amorphous carbon through heat treatment. Amorphous carbon can impart sufficient strength to maintain the shape of the core-shell, thereby inhibiting the expansion of the core.

In the secondary graphene-silicon composite, the weight ratio of silicon to reduced graphene oxide sheet and conductive carbon may be in the range of from 30:70 to 55:45. When the silicon content is lower than the lower limit of the above range, it is not desirable because the capacity per unit volume is reduced. When the silicon content is low, the buffering effect obtained due to the reduced graphene oxide sheet and the conductive carbon may not be sufficient, and the mechanical strength is reduced. Therefore, there is a risk of durability deterioration. Specifically, the weight ratio may range from 35:65 to 45:55.

The average particle size $D_{50}$ of the secondary graphene-silicon composite may be in the range of from 5 to 20 μm. When the average particle size $D_{50}$ is smaller than the lower limit of the above range, the process efficiency decreases. Conversely, when the average particle size $D_{50}$ is excessively large and exceeds the upper limit of the above range, it is undesirable because pulverization (fine-graining) and contact with the electrolyte may occur during charging and discharging.

Lithium Secondary Battery

In addition, the present disclosure discloses a lithium secondary battery including the anode active material including the graphene-silicon composite.

The lithium secondary battery may include a cathode containing a cathode active material, an anode containing the anode active material, and an electrolyte.

The cathode is formed by applying a cathode preparation mixture including a cathode active material to a current collector, and the cathode preparation mixture may further include a binder and a conductive material, if necessary.

The cathode active material is, for example, a lithium metal oxide (0<x<1, 0<y<1) such as $LiNi_{0.8-x}Co_{0.2}Al_yO_2$, $LiCo_xMn_yO_2$, $LiNi_xCo_yO_2$, $LiNi_xMn_yO_2$, $LiNi_xCo_yMn_zO_2$, $LiCoO_2$, $LiNiO_2$, $LiMnO_2$, $LiFePO_4$, $LiCoPO_4$, $LiMnPO_4$, or $Li_4Ti_5O_{12}$. Alternatively, the cathode active material may be a chalcogenide such as $Cu_2Mo_6S_8$, FeS, CoS, or MiS. Further alternatively, the cathode active material may be any one selected from among oxides, sulfides, and halides of scandium, ruthenium, titanium, vanadium, molybdenum, chromium, manganese, iron, cobalt, nickel, copper, zinc, etc. More specifically, $LiNi_{0.8}Co_{0.1}Mn_{0.1}O_2$, $TiS_2$, $ZrS_2$, $RuO_2$, $Co_3O_4$, $Mo_6S_8$, and $V_2O_5$, etc. may be used as the cathode active material, but the cathode active material is not limited thereto.

The shape of the cathode active material is not particularly limited. That is, the cathode active material may be in the form of particulate. For example, the shape of the cathode active material may be a spherical shape, an oval shape, or a rectangular parallelepiped shape. The average particle size of the cathode electrode active material may be in the range of 1 to 50 μm but is not limited thereto. The average particle size of the cathode active material can be obtained by measuring the sizes of the particles of the active material with a scanning electron microscope (SEM) and calculating an average value thereof.

The binder is not particularly limited. A fluorine-containing binder such as polyvinylidene fluoride (PVDF) and polytetrafluoroethylene (PTFE) may be used, but the binder is not limited thereto.

The content of the binder is not particularly limited as long as the binder can bind the cathode active material. The content may be in the range of 0% to 10% by weight with respect to the total weight of the cathode.

The conductive material is not particularly limited as long as the conductivity of the cathode can be improved. For example, nickel powder, cobalt oxide, titanium oxide, carbon, and the like may be used. The carbon, specifically, may be any one or a combination of two or more selected from the group consisting of Ketjen black, acetylene black, furnace black, graphite, carbon fiber, and fullerene.

The content of the conductive material may be determined in consideration of other battery conditions such as the type of the conductive material. For example, the content may be in the range of 1% to 10% by weight with respect to the total weight of the cathode.

The thickness of a layer made of the cathode preparation mixture including the cathode active material, the binder, and the conductive material may be, for example, in the range of from 0.1 to 1000 μm when the cathode preparation mixture is applied on the current collector.

In some cases, in the present disclosure, the cathode preparation mixture may include 0.1% to 60% by weight, specifically 10% to 50% by weight, of a solid electrolyte with respect to the total weight of the cathode preparation mixture.

The thickness of the layer of the cathode preparation mixture may be, for example, in the range of from 0.1 to 1000 μm.

The material of the cathode current collector is not particularly limited as long as it has high conductivity without causing chemical change in the battery. For example, stainless steel, aluminum, nickel, titanium, or fired carbon may be used. Alternatively, a base member of the cathode current collector is made of stainless steel, aluminum, nickel, titanium, or fired carbon, and the surface of the base member may be treated with carbon, nickel, titanium, silver, or the like. In addition, the cathode current collector may take an arbitrary form such as a film, a sheet, a foil, a net, a porous body, a foam, or a non-woven body, and the surface of such a cathode current collector may have fine irregularities.

An anode includes an anode current collector and an anode preparation mixture applied on the anode current collector, in which the anode preparation mixture includes an anode active material. The anode active material may be the anode active material proposed by the present disclosure. However, in some cases, metal oxide, metal, lithium composite oxide, crystalline carbon, amorphous carbon, etc. may be used together. The anode preparation mixture may further include a binder and a conductive material that are the same as described above, if necessary.

The material of the anode current collector is not particularly limited as long as it has conductivity and does not cause chemical change in the battery. For example, copper, stainless steel, aluminum, nickel, titanium, or fired carbon may be used. Alternatively, a base member of the anode current collector is made of copper or stainless steel, and carbon, nickel, titanium, silver, or the like may be formed on the copper or stainless steel base member. In addition, similarly to the cathode current collector, the anode current collector may take an arbitrary form such as a film, a sheet, a foil, a net, a porous body, a foam, and a non-woven body, and the surface of such an anode current collector may have fine irregularities.

The electrolyte is composed of an organic solvent and an electrolyte material.

The organic solvent is not particularly limited if it is a commonly used one. For example, one or more materials selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxy ethane, diethoxyethane, vinylene carbonate, sulfolane, gamma-butyrolactone, propylene sulfite, and tetrahydrofuran may be used.

There is no limitation as long as a lithium salt that may be included as the electrolyte is commonly used. For example, as an anion of the lithium salt, one or more types of anions selected from the group consisting of $F^-$, $Cl^-$, $I^-$, $NO^{3-}$, $N(CN)^{2-}$, $BF^{4-}$, $ClO^{4-}$, $PF^{6-}$, $(CF_3)_2PF^{4-}$, $(CF_3)_3PF^{3-}$, $(CF_3)_4PF^{2-}$, $(CF_3)_5PF^-$, $(CF_3)_6P^-$, $CF_3SO^{3-}$, $CF_3CF_2SO^{3-}$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO^{3-}$, $CF_3CO^{2-}$, $CH_3CO^{2-}$, $SCN^-$, and $(CF_3CF_2SO_2)_2N^-$ may be used.

A battery structure is formed by arranging a separator between the cathode and the anode, and the battery structure is wound or folded, and is then placed in a cylindrical battery case or a prismatic battery case. Next, the electrolyte is injected into the battery case to complete a secondary battery. Alternatively, a lithium secondary battery is completed by stacking the battery structures in the form of a bi-cell structure, impregnating the bi-cell structure with the electrolyte, and sealing the obtained result in a pouch.

Although a description will be made with reference to the following examples, the following examples are for the purpose of illustrating the present disclosure, and the scope of the present disclosure is not limited thereto.

Example 1

A graphene oxide sheet in an amount of 10% by weight respect to the total weight of a primary graphene-silicon composite, and silicon nanoparticles were mixed in ethanol, and then the mixture was dried by spray drying. Next, the resulting dry mixture was heated at 300° C. for 30 minutes in an $Ar/H_2$ 5% atmosphere to prepare the primary graphene-silicon composite in which the silicon nanoparticles were formed on the reduced graphene oxide sheet.

Pitch in an amount 1% by weight relative to the total weight of a secondary graphene-silicon composite, and graphite were added to the primary graphene-silicon composite and mixed. The resulting mixture was fired at 970° C. for 1 hour in an inert atmosphere to produce the secondary graphene-silicon composite having an average particle size $D_{50}$ of 10 μm. In this case, the weight ratio of silicon to the reduced graphene oxide sheet and conductive carbon was 40:60.

Example 2-1

A secondary graphene-silicon composite was prepared in the same manner as Example 1, except that the amount of the pitch used was 2% by weight.

Example 2-2

A secondary graphene-silicon composite was prepared in the same manner as Example 1, except that the amount of the pitch used was 5% by weight.

Example 2-3

A secondary graphene-silicon composite was prepared in the same manner as Example 1, except that the amount of the pitch used was 10% by weight.

Example 3-1

A secondary graphene-silicon composite was prepared in the same manner as Example 1, except that the amount of the graphene oxide sheet used was 20% by weight relative to the total weight of the primary graphene-silicon composite.

Example 3-2

A secondary graphene-silicon composite was prepared in the same manner as Example 1, except that the amount of the graphene oxide sheet used was 30% by weight relative to the total weight of the primary graphene-silicon composite.

Example 3-3

A secondary graphene-silicon composite was prepared in the same manner as Example 1, except that the amount of the graphene oxide sheet used was 40% by weight relative to the total weight of the primary graphene-silicon composite.

Example 4-1

A secondary graphene-silicon composite was prepared in the same manner as Example 1, except that the amount of the graphene oxide sheet used was 30% by weight relative to the total weight of the primary graphene-silicon composite and the firing was performed at 900° C. for 1 hour.

Example 4-2

A secondary graphene-silicon composite was prepared in the same manner as Example 1, except that the amount of the graphene oxide sheet used was 30% by weight relative to the total weight of the primary graphene-silicon composite and the firing was performed at 600° C. for 1 hour.

Experimental Example 1

Figure 3A:
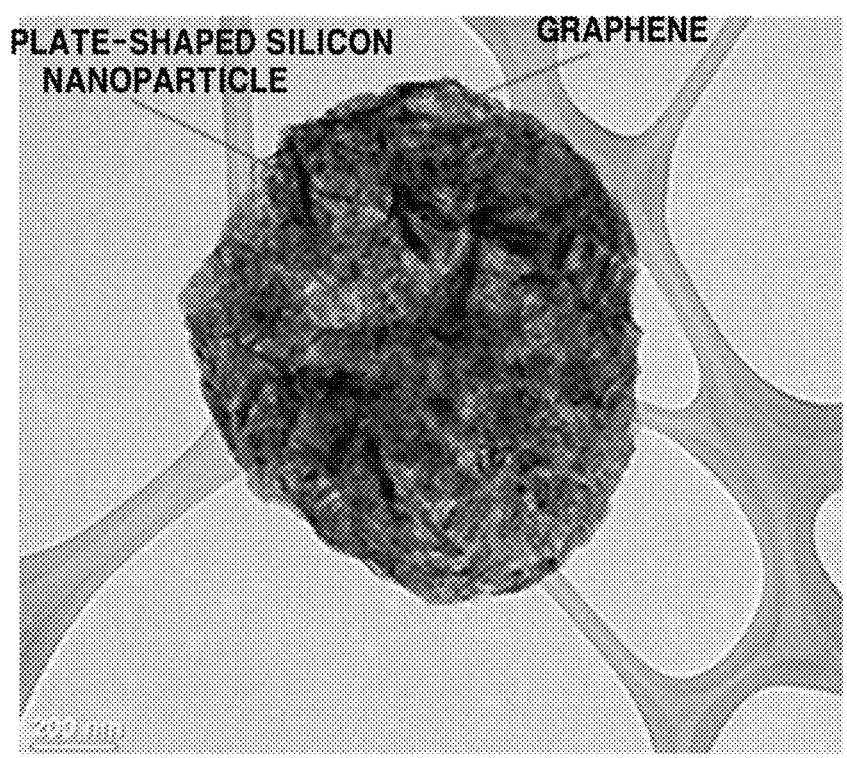
FIGS. 3A and 3B are a TEM image and EDS analysis result of a primary graphene-silicon composite that is not yet reduced as in Example 1, respectively.
Figure 3B:
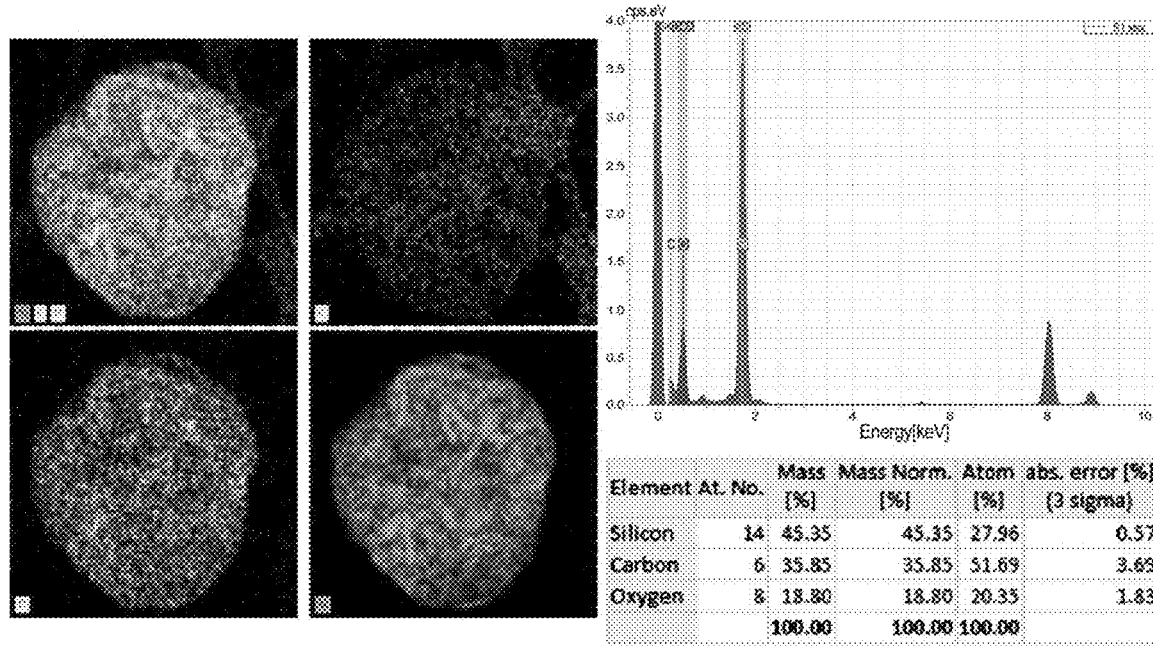

TEM images and EDS analysis results of the primary graphene-silicon composite that had not yet been reduced in Example 1 are shown in FIGS. 3A and 3B, respectively.

According to FIGS. 3A and 3B, it can be seen that the primary graphene-silicon composite before reduction is in a form in which silicon-containing particles are coupled on a graphene oxide sheet.

Experimental Example 2

Figure 4A:
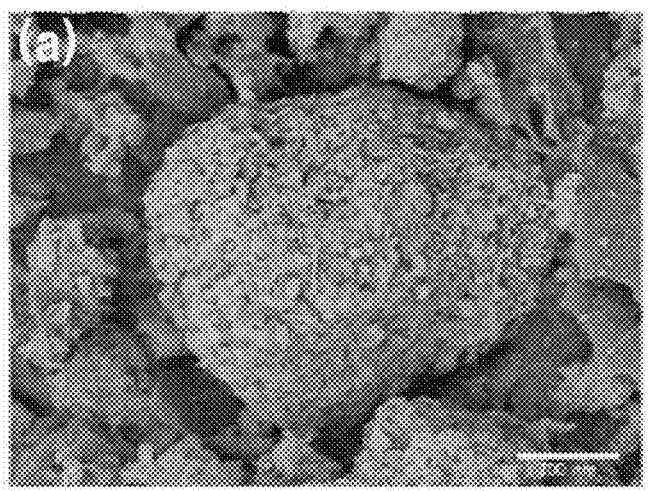
FIG. 4A is an SEM image of a primary photograph of a reduced primary graphene-silicon composite SEM in Experimental Example 2.
Figure 4B:
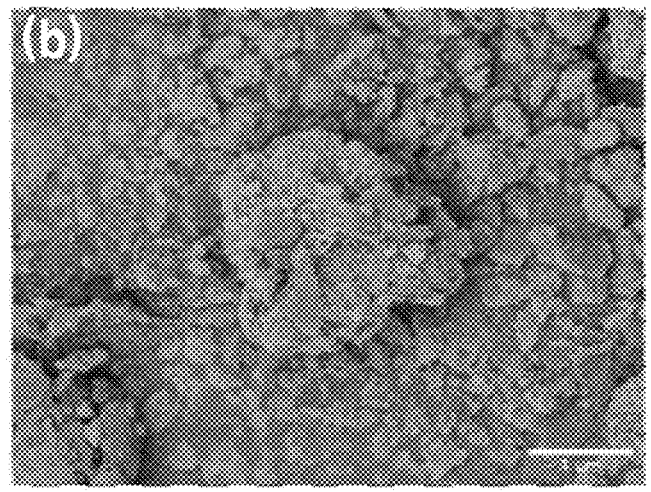
FIGS. 4B, 4C, 4D, and 4E are SEM images of a secondary graphene-silicon composite in Experimental Example 2.
Figure 4C:
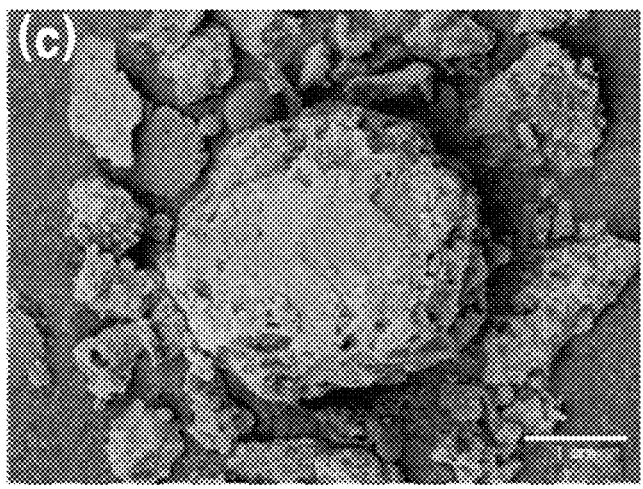
Figure 4D:
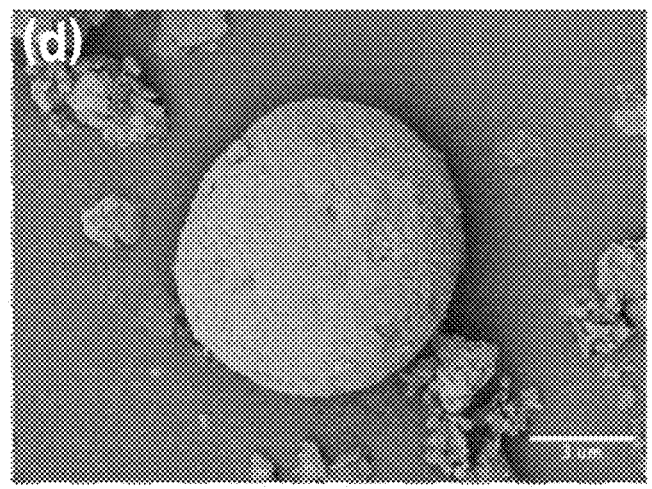
Figure 4E:
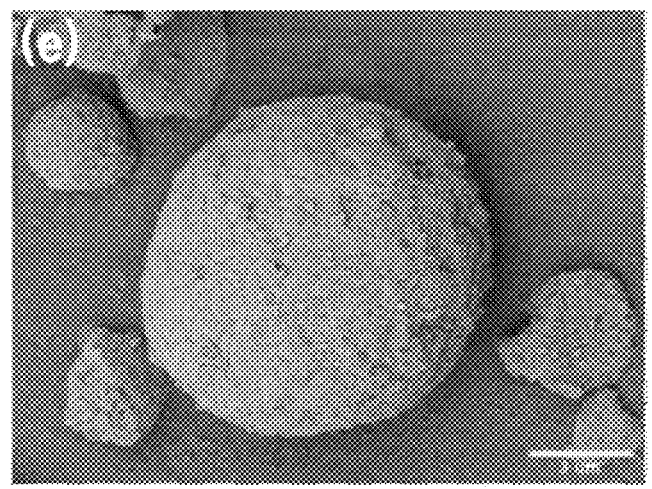

FIGS. 4A to 4E are SEM images, in which FIG. 4A shows the reduced primary graphene-silicon composite prepared according to Example 1, FIG. 4B shows the secondary graphene-silicon composite prepared according to Example 1, FIG. 4C shows the secondary graphene-silicon composite prepared according to Example 2-1, FIG. 4D shows the secondary graphene-silicon composite prepared according to Example 2-2, and FIG. 4E shows the secondary graphene-silicon complex prepared according to Example 2-3.

Referring to FIG. 4A, even after the reduction, the laminate in which the reduced graphene oxide sheet(s) and the silicon-containing particles are combined is maintained. Referring to FIGS. 4B to 4D, the structural stability of the secondary graphene-silicon composite increases as the content of the pitch used increases.

Experimental Example 3

Each of several anode preparation mixtures was prepared by mixing one of the secondary graphene-silicon composites prepared according to Examples 1, 3-1, 3-2, and 3-3, respectively, graphite, a conductive material, CMC, and SBR in a weight ratio of 13.36:78.64:5:1.5:1.5. Anode plates were prepared from the respective anode preparation mixtures and cut into circular electrodes to serve as anodes. Cathodes having the same size and shape as the anodes were made from lithium. Here, lithium coin half-cells were manufactured under the following conditions, and the electrical conductivity and capacity of the half-cells were measured. The results are shown in Table 1 and FIG. 6.

Secondary graphene-silicon composite (1370 mAh/g): 13.36% by weight, Graphite (360 mAh/g): 78.64% by weight, Conductive material (330 mAh/g): 5% by weight, SBR (solid 40% by weight): 1.5% by weight (solution basis: 3.75)

L/L (loading level)=6.04 g/cm$^2$, E/D (press density)=1.59 g/cc

Electrolyte: 1M LiPF$_6$ in EC:DEC=1:1+FEC 5% by weight

Char: CC/CV, 0.1 C/0.01 V, 0.01 C cut-off

Disch: CC, 0.1 C/1.5 V cut-off

TABLE 1

| Graphene content (% by weight) | Firing temperature (° C.) | Electrical conductivity (S/cm) | Capacity (mAh/g) |
| --- | --- | --- | --- |
| 10 (Example 1) | 970 | 12.7 | 493.4 |
| 20 (Example 3-1) | 970 | 14.9 | 494.1 |
| 30 (Example 3-2) | 970 | 17.0 | 497.8 |
| 40 (Example 3-3) | 970 | 17.0 | 501.9 |

Figure 6:
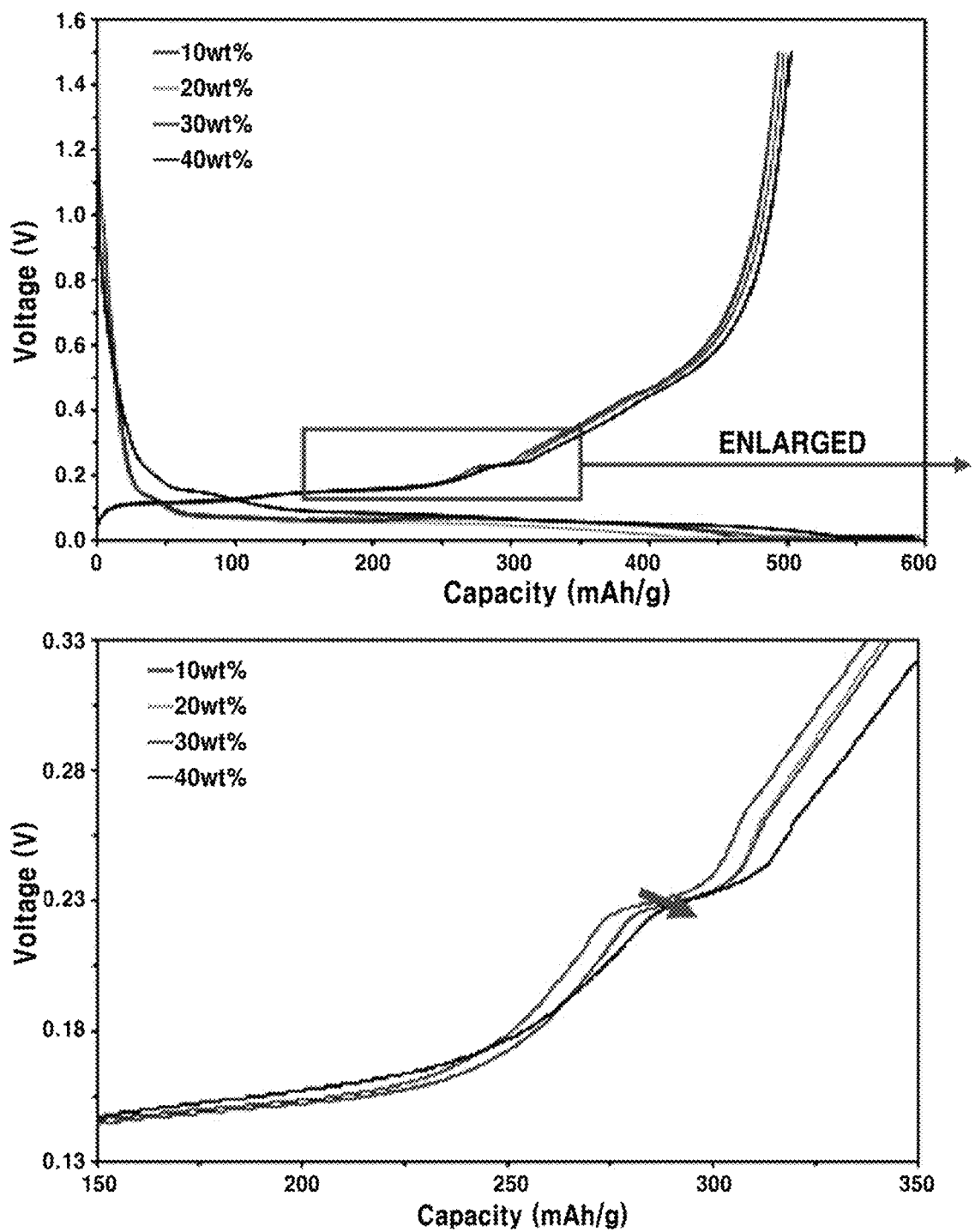
FIG. 6 shows the results of electrical conductivity and capacity measurement according to Experimental Example 3.

According to Table 1 and FIG. 6, the anode active material including the secondary graphene-silicon composite prepared according to the present disclosure exhibits an increasing electrical conductivity and an increasing capacity with an increase in the graphene content.

Experimental Example 4

Figure 7A:
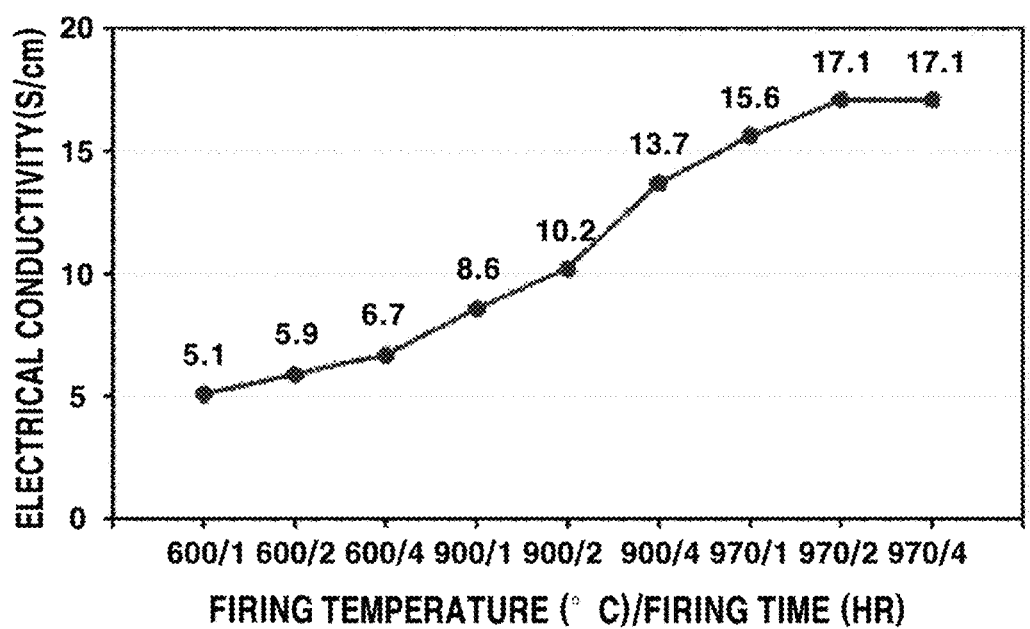
FIGS. 7A and 7B are results of measurements of a dose and CRR according to Experimental Example 5.
Figure 7B:
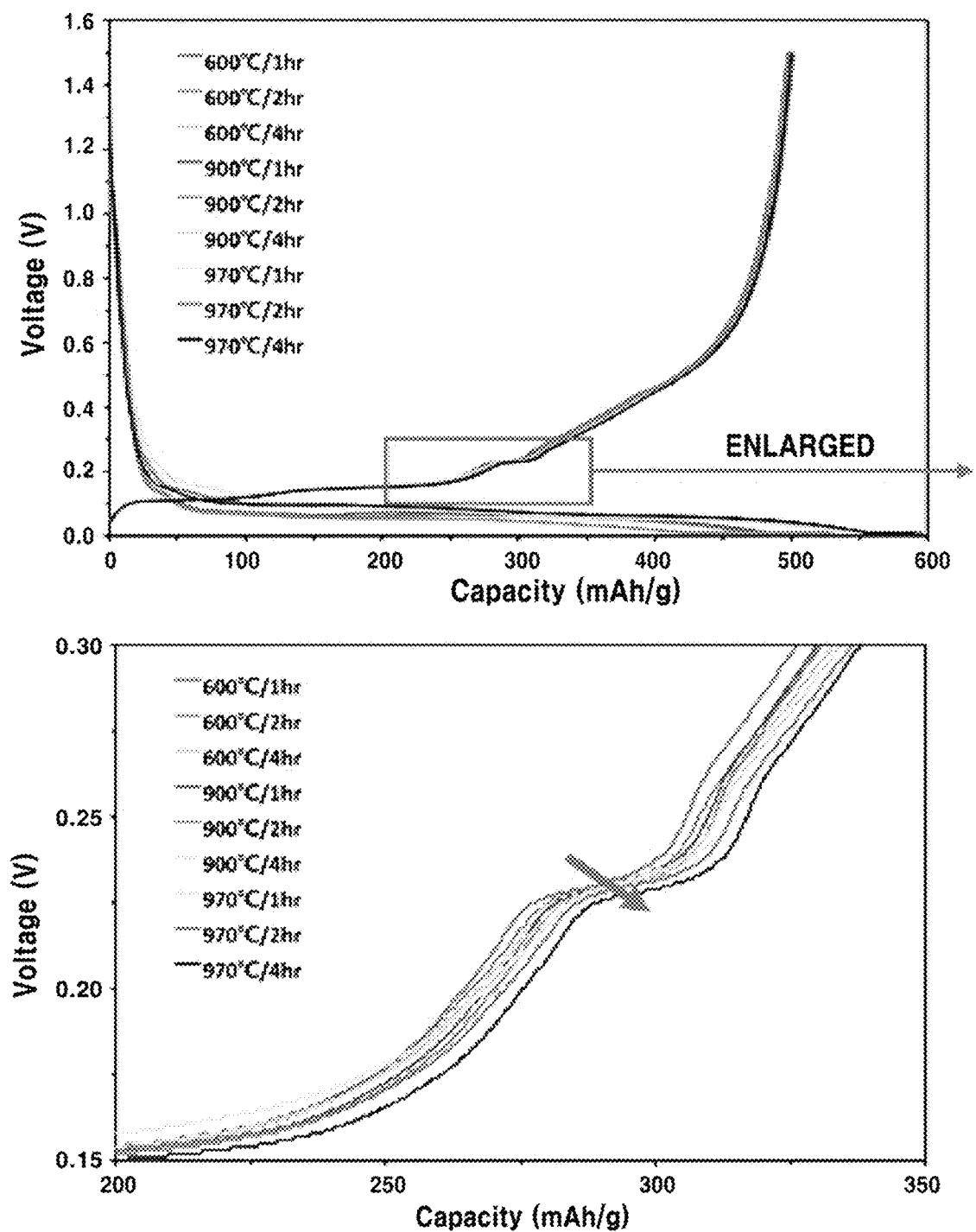

Secondary graphene-silicon composites were prepared while setting the firing times as 1, 2, and 4 hours, during the preparation of the secondary graphene-silicon composites according to Examples 3-2, 4-1, and 4-2. Next, after preparing a lithium coin half-cell according to the method of Experimental Example 3, the electrical conductivity and the capacity are measured. The results are shown in Table 2, and FIGS. 7A and 7B.

TABLE 2

| Firing temperature (° C.) | Graphene content (% by weight) | Firing time (hr) | Electrical conductivity (S/cm) | Capacity (mAh/g) |
| --- | --- | --- | --- | --- |
| 600 | 30 (Example 4-2) | 1 | 5.1 | 496.6 |
|  | 30 (Example 4-2-1) | 2 | 5.9 | 498.1 |
|  | 30 (Example 4-2-2) | 4 | 6.7 | 499.2 |
| 900 | 30 (Example 4-1) | 1 | 8.6 | 497.8 |
|  | 30 (Example 4-1-1) | 2 | 10.2 | 497.2 |
|  | 30 (Example 4-1-2) | 4 | 13.7 | 500.0 |
| 970 | 30 (Example 3-2) | 1 | 15.6 | 499.2 |
|  | 30 (Example 3-2-1) | 2 | 17.1 | 510.0 |
|  | 30 (Example 3-2-2) | 4 | 17.1 | 499.6 |

According to Table 2 and FIGS. 6A and 6B, it can be seen that the anode active material including the secondary graphene-silicon composite prepared according to the present disclosure has excellent electrical conductivity and capacity.

Experimental Example 5

To measure the efficiency, formation value, etc. of the secondary graphene-silicon composites according to Example 3-2-1 and 4, lithium coin half-cells were prepared according to the method of Experimental Example 3. The measurements are shown in Table 3 and FIGS. 5A and 5B.

TABLE 3

| Coin | SiGC (calculated value) Formation (0.1 C/0.1 C) | | Blending (experiment value) Formation (0.1 C/0.1 C) | | CRR (@50 cycle) Formation |
|---|---|---|---|---|---|
| Half-Cell | Capacity (mAh/g) | Efficiency (%) | Capacity (mAh/g) | Efficiency (%) | (0.3 C/1.0 C) % |
| Si/C | 1370 | 87.82 | 510 | 90.30 | 88.94 |

Figure 5A:
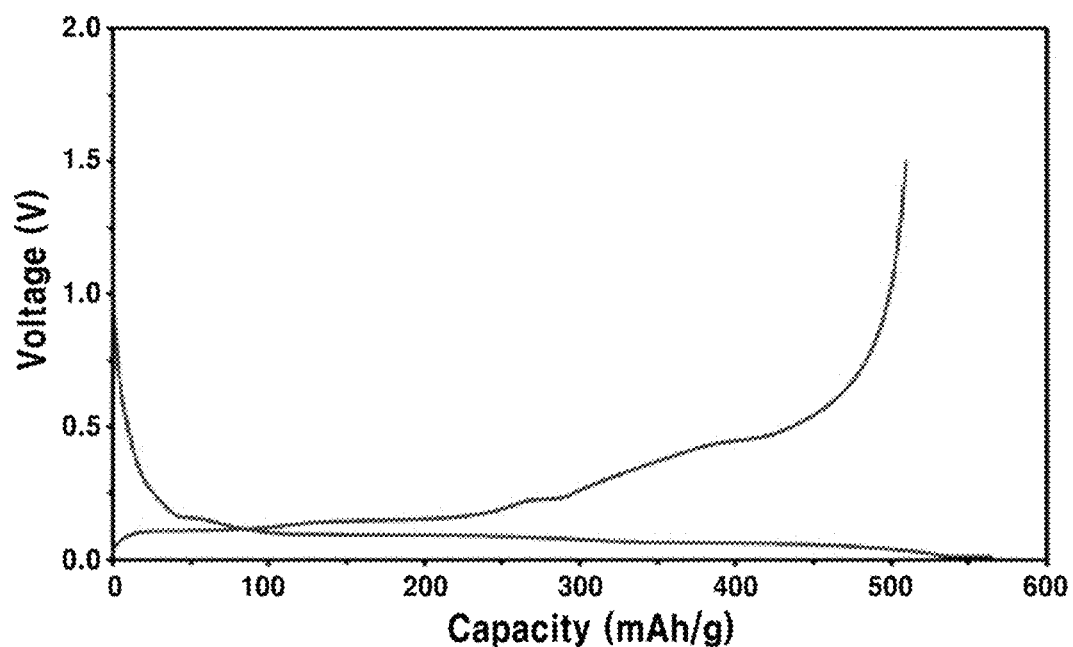
FIG. 5A and FIG. 5B show results of electrical conductivity and capacity measurement according to Experimental Example 5.
Figure 5B:
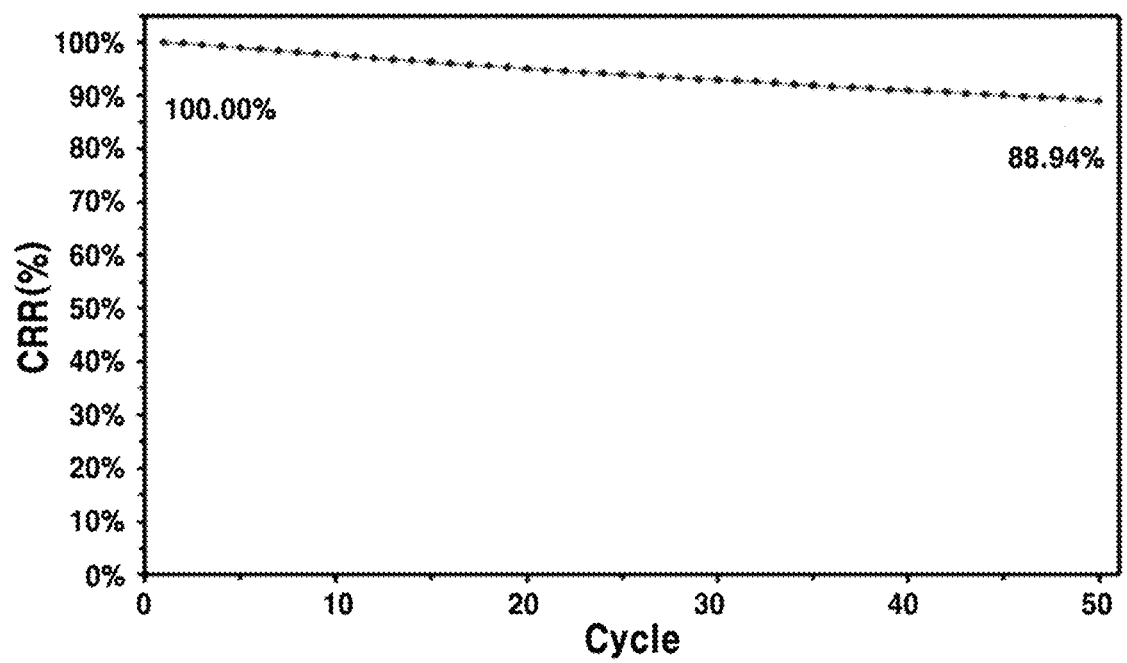

Referring to Table 3 and FIGS. 5A and 5B, it can be seen that the secondary graphene-silicon composite of Example 3-2-1 exhibits excellent capacity and efficiency.

The invention claimed is:

1. A method of preparing a graphene-silicon composite which is a secondary graphene-silicon composite in which a primary graphene-silicon composite is formed on a conductive carbon matrix, the method comprising:
   (a) wet mixing in an organic solvent and drying a graphene sheet and a silicon precursor;
   (b) preparing the primary graphene-silicon composite formed of silicon-containing particles laminated on a reduced graphene oxide sheet obtained by heat treating the mixture of the graphene oxide sheet and the silicon precursor; and
   (c) firing the primary graphene-silicon composite in an inert atmosphere after applying a conductive carbon precursor to the primary graphene-silicon composite to produce the secondary graphene-silicon composite.

2. The method of claim 1, wherein the primary graphene-silicon composite is structured such that one or more silicon-containing particles and one or more reduced graphene oxide sheets are alternately laminated by electrostatic attraction.

3. The method of claim 1 wherein in step (a), the content of the graphene oxide sheet is in the range of from 5% to 50% by weight with respect to the total weight of the primary graphene-silicon composite.

4. The method of claim 1, wherein in step (b), the heat treatment is carried out in an atmosphere comprising 3% to 10% hydrogen and a balance of argon for 10 to 60 minutes under a temperature condition of 200° C. to 400° C.

5. The method of claim 1, wherein in step (c), the conductive carbon precursor comprises 0.5% to 20% by weight of an amorphous carbon precursor with respect to the total weight of the secondary graphene-silicon composite.

6. The method of claim 1, wherein in step (c), the firing is performed at a temperature in the range of from 500° C. to 1200° C. for 0.5 to 5 hours.

7. The method of claim 1, wherein in the secondary graphene-silicon composite, the weight ratio of silicon to the reduced graphene oxide sheet and conductive carbon is in the range of from 30:70 to 55:45.

8. The method of claim 1, wherein the secondary graphene-silicon composite has an average particle size $D_{50}$ in the range of from 5 to 20 μm.

9. A method of preparing a graphene-silicon composite which is a secondary graphene-silicon composite in which primary graphene-silicon composite is formed on a conductive carbon matrix, the method comprising:
   (a) wet mixing and drying a graphene sheet and a silicon precursor;
   (b) preparing the primary graphene-silicon composite formed of silicon-containing particles laminated on a reduced graphene oxide sheet obtained by heat treating the mixture of the graphene oxide sheet and the silicon precursor, wherein the heat treatment is carried out in atmosphere comprising 3% to 10% hydrogen and a balance of argon for 10 to 60 minutes under a temperature condition of 200° C. to 400° C.; and
   (c) firing the primary graphene-silicon composite in an inert atmosphere after applying a conductive carbon precursor to the primary graphene-silicon composite to produce the secondary graphene-silicon composite.

10. A method of preparing a graphene-silicon composite which is a secondary graphene-silicon composite in which primary graphene-silicon composite is formed on a conductive carbon matrix, the method comprising:
   (a) wet mixing and drying a graphene sheet and a silicon precursor;
   (b) preparing the primary graphene-silicon composite formed of silicon-containing particles laminated on a reduced graphene oxide sheet obtained by heat treating the mixture of the graphene oxide sheet and the silicon precursor; and
   (c) firing the primary graphene-silicon composite in an inert atmosphere after applying a conductive carbon precursor to the primary graphene-silicon composite to produce the secondary graphene-silicon composite, wherein the step of firing is carried out at a temperature range of from 500° C. to 120° C. for 0.5 to 5 hour.

* * * * *